Aug. 5, 1952    D. KRONHAUS ET AL    2,605,569
FISHLINE CASTING DEVICE
Filed May 29, 1950

INVENTORS
DINA KRONHAUS
LUBA LIFSCHUTZ
BY
*Mason & Graham*

ATTORNEYS

Patented Aug. 5, 1952

2,605,569

UNITED STATES PATENT OFFICE 2,605,569

FISHLINE CASTING DEVICE

Dina Kronhaus and Luba Lifschutz, Los Angeles, Calif.

Application May 29, 1950, Serial No. 164,924

1 Claim. (Cl. 43—19)

This invention has to do with fishing tackle and, more particularly, relates to a casting device by which a fisherman casts a lure or a baited hook.

The conventional manner of casting a fish line is to swing the rod backwardly and then forwardly with a snap action, which oftentimes results in the line becoming entangled with trees and the like and, not infrequently, results in injury to bystanders by reason of the hook catching and hooking into the skin.

Our invention overcomes those difficulties and has, as an object, the provision of a line propelling gun attached to the base of a fishing rod in convenient position for use. Other objects will appear hereinafter.

Without intending thereby to limit the broader aspects of the invention as defined by the accompanying claim, we shall now describe, in detail, a presently preferred embodiment of our invention, for which purpose we shall refer to the accompanying drawings, wherein:

Figure 1:
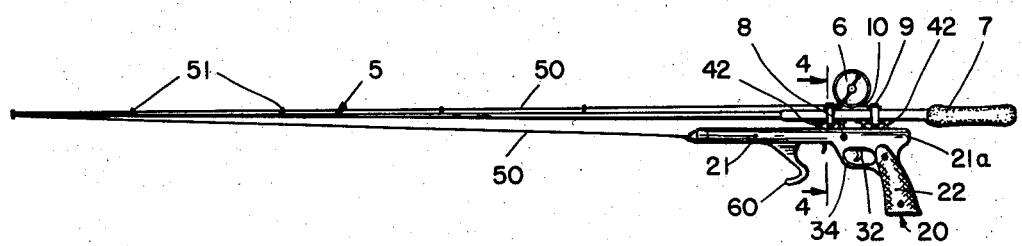
Fig. 1 is a side elevation.
Figure 2:
Fig. 2 is a top plan view.

Referring to the drawings, 5 denotes a conventional fish rod mounting a conventional reel 6, and having a handle 7. The rod slidably carries two split clamping sleeves 8, 9 for clamping the reel tongues 10 against the rod.

A gun 20 has a barrel or tube 21 and a handle 22. A compression spring 25 is mounted in the barrel, bearing at its inner or right end against the inner end 21a of the barrel and bearing at its outer end against a plunger 27 which is slidably mounted in the barrel.

Figure 3:
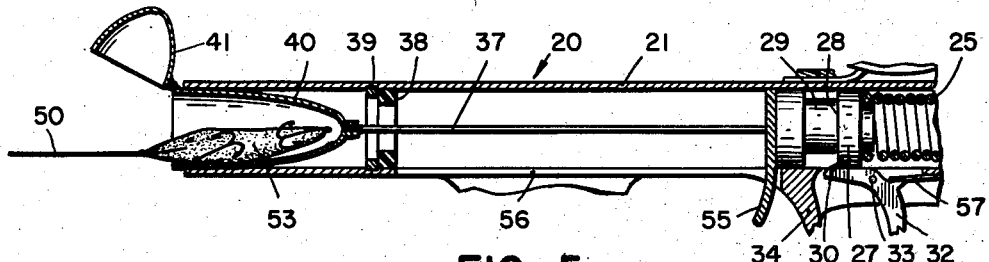
Fig. 3 is an enlarged longitudinal section of the barrel portion of the gun element, showing the line propelling member fitted into the end of the barrel.

The spring 25 is shown compressed in Fig. 3 and, in this position, the annular shoulder 28, formed on the plunger by the reduced diameter portion 29, is engaged by the dog 30 of a trigger 32. The trigger is pivoted to the barrel at 33 and its outer portion is disposed within a guard 34.

A rigid stem 37 is fixed at its inner end to the plunger, extends through a stop ring 38 fixed in the barrel, and at its outer end carries a bullet-shaped cup 40, having a hinged cover flap 41 at its outer end. The stop 38 is held in the barrel by a snap ring 39.

The gun is secured to the rod 5 by means of a pair of longitudinally spaced bosses 42 each carrying a tongue 43 of arcuate cross section to bear against the rod 5. The clamping sleeves 8 and 9 engage those tongues and clamp them against the rod, the sleeves being retained in clamping position by the thumb screws 45.

The fishline 50 extends from the reel, through eyes 51, and carries a lure or baited hook 53 at its outer end. The free outer end portion of the line carrying the lure is drawn backwardly beneath the rod, and the lure is placed in the cup 40. The gun is cocked by sliding the plunger to the right in the barrel, by means of the radial projection 55 on the plunger, which projects through a longitudinal slot 56 in the barrel, until the plunger shoulder is engaged by the trigger dog 30 and locked. Then, when it is desired to cast the line, it is only necessary to release the trigger. The spring then rapidly propels the plunger to the left until it suddenly engages the stop 38. Thus, the lure is propelled from the cup in the desired direction with considerable force, by virtue of the momentum thus imparted thereto, carrying with it the line. The user then may reel in the line in the customary manner. The trigger is urged into plug locking position by a leaf spring 57.

A hand hold knob 60 may be carried by the barrel to facilitate proper steadying of the rod.

While we have described a spring operated type of gun for propelling the baited line in the casting operation, it will be understood that air guns or other fluid-actuated guns may be substituted for the purpose. For instance, in Fig. 5 we show a compressed air gun 60 having a barrel 62 in which plunger 64 is slidably mounted. The plunger has a rod 65 threadedly carrying the hook cup 40a at its outer end, the cup having a hinged flap 41a. A stop ring 38a is held against outward escape from the barrel by a snap ring 39a. A partition wall 70, secured in the barrel, forms a compressed air chamber 71 to which the plunger is exposed, the wall 70 having an axial hole 73 normally closed by a resilient flap check valve 74. A pumping plunger 75 is slidably mounted in the right end of the barrel, being operable by a handle and connecting rod member 77. The latter plunger has an air inlet hole 78 normally closed by a resilient flap valve 79.

A trigger 80 is pivoted to the barrel at 81 and has a dog 82 engaging the annular shoulder 83 of the plunger 64. The trigger is urged into plunger locking position by a leaf spring 85.

Figure 5:
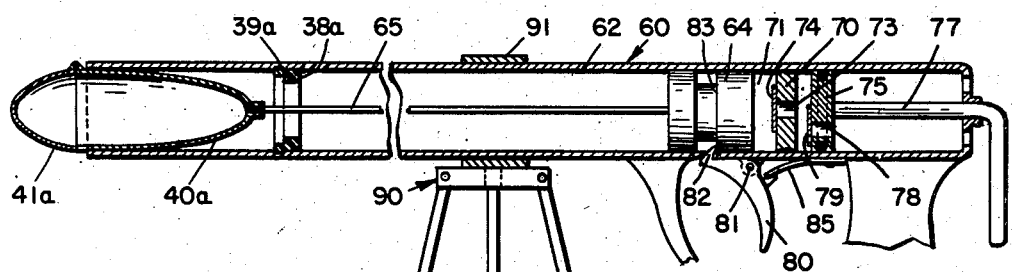
Fig. 5 is a longitudinal section of a modified form of the invention.
Figure 4:
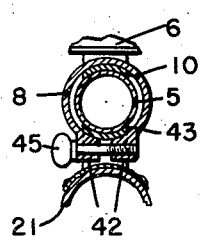
Fig. 4 is an enlarged section taken on line 4—4 of Fig. 1.

The device of Fig. 5 is operated as follows:

First the plunger is pushed to the right by pushing inwardly on the cup 40a, until dog 82 engages shoulder 83. Then the user pumps air into chamber 71 by means of the pumping plunger 75 until the desired air pressure is obtained in the chamber. This pressure will depend upon the distance of the desired cast. Upon release of the trigger, the plunger 64 will be moved to the left, propelling forward the baited hook or lure in the cup. As the lure leaves the cup, the flap 41a will swing outwardly. The flap is made bullet-shaped so as to offer a minimum of air resistance.

By use of our casting device, fishing rods do not have to be made long and flexible, as is customarily the case.

If desired a tripod support 90 may be provided, as shown in Fig. 5, being attached to the barrel by a strap 91.

We claim:

A bait and line casting attachment for a fishing rod comprising a tubular housing, a power actuated plunger in the housing, a stop for said plunger adjacent the outer end of the housing, a hollow, bullet shaped bait receiving retainer secured to the outer end of said plunger and normally housed within the outer end of said housing outwardly of said stop, said retainer having an open outer end, a bullet shaped cover lid hingedly mounted on the open end of said retainer and normally projecting from said end of the housing and means for mounting said housing upon a fishing rod.

DINA KRONHAUS.
LUBA LIFSCHUTZ.

REFERENCES CITED

The following references are of record in the file of this patent:

UNITED STATES PATENTS

| Number | Name | Date |
|---|---|---|
| 764,853 | Kimberlin | July 12, 1904 |
| 1,598,323 | Spencer | Aug. 31, 1926 |
| 2,225,719 | Shotton | Dec. 24, 1940 |
| 2,247,561 | Rowe | July 1, 1941 |
| 2,305,176 | Littman | Dec. 15, 1942 |
| 2,531,418 | Fitzharris | Nov. 28, 1950 |